United States Patent [19]

Tanabe

[11] Patent Number: 5,230,760
[45] Date of Patent: Jul. 27, 1993

[54] METHOD FOR MANUFACTURING MICRO MEMBRANE PLEATS TYPE FILTER CARTRIDGE

[75] Inventor: Kazushige Tanabe, Tokyo, Japan
[73] Assignee: Nippon Roki Co., Ltd., Tokyo, Japan
[21] Appl. No.: 808,483
[22] Filed: Dec. 17, 1991

[30] Foreign Application Priority Data

Nov. 6, 1991 [JP] Japan .................. 3-317398

[51] Int. Cl.$^5$ .............................................. B65B 7/28
[52] U.S. Cl. ............................. 156/69; 156/306.6; 156/313; 156/314; 156/321; 156/322; 55/502; 55/510
[58] Field of Search ................ 156/69, 313, 314, 321, 156/322, 306.6; 55/502, 510

[56] References Cited

U.S. PATENT DOCUMENTS 4,588,464  5/1986  Miyagi ............................. 156/69
4,844,765  7/1989  Reith .............................. 156/306.6

Primary Examiner—David A. Simmons
Assistant Examiner—Paul M. Rivard
Attorney, Agent, or Firm—Armstrong, Westerman, Hattori, McLeland & Naughton

[57] ABSTRACT

The object of the present invention is to provide a filter cartridge of micro filtration membrane pleats type, by which it is possible to stably manufacture products of high quality and to reduce the manufacturing cost. In the method for manufacturing a filter cartridge of micro membrane pleats according to the present invention, an initial portion and a last portion with pleats of a micro filtration membrane are welded together to prepare an endless micro membrane, and a filter element provided with a micro filtration membrane is welded on two end plates. A thin bonding auxiliary plate made of the same material as the end plates, having an opening at its center and molten at relatively low temperature, is welded to filter element and end plates which are heated in advance.

6 Claims, 2 Drawing Sheets

METHOD FOR MANUFACTURING MICRO MEMBRANE PLEATS TYPE FILTER CARTRIDGE

BACKGROUND OF THE INVENTION

The present invention relates a method for manufacturing a filter cartridge of micro membrane pleats, and in particular to a method for manufacturing a filter cartridge of micro membrane pleats type for stable production of products of high quality.

In recent years, there have been strong demands on the filter cartridge of the micro membrane pleats type for the applications such as the filtration of pure water for rinsing in the semiconductor industry, the industrial filtration for supplying ultra-pure water, the filtration of various types of chemical solutions, the filtration for sterilization in the food industry, the filtration for purification and separation in the pharmaceutical industry, etc.

The production technology of micro filtration membranes to be used for this filter cartridge has recently shown remarkable progress to cope with the increasing demands, and the cost for the membranes has rapidly decreased.

However, the welding and assembling technique is not yet firmly established to weld a micro filtration membrane, which is provided with pleats to increase filtration area, on end plates, and the product cannot be supplied at low cost despite of the increase in demand.

In welding an initial portion and a last of the micro filtration membrane provided with pleats, endless welding can be achieved by heat sealing or ultrasonic welding methods because the membranes are thin. However, it is not easy to weld the micro filtration membrane and the end plates because of the difference in heat absorption. For this reason, there are some variations in product quality and the production is unstable in terms of quality. Because a micro membrane pleats type filter cartridge is used for the applications as described above, even a small pinhole is not allowed. As the result, products are often rejected in large quantity, and this leads to an increase in cost.

A method has been known for welding the micro filtration membrane and the end plates. In the case in which the plate material is polypropylene resin, the same polypropylene resin is molten and this is extruded by an extruder and coated over the entire surface of the plate. A filter element provided with an endless micro filtration membrane (hereinafter simply referred as 'filter element') is quickly embedded on it and welded and sealed. Another method is generally practiced, by which heat is applied on a surface of a plate where a filter element is to be embedded and the heated portion is molten, and filter element is embedded quickly, welded and sealed.

In the former method, however, molten resin discharged from nozzles of an extruder traps air while it reaches the plate surface, and the filter element is embedded without removing the air bubbles thus generated. As the result, slight leakage occurs from the air bubbles, and this hinders normal functions of the filter cartridge of micro filtration membrane type. Moreover, the stagnated resin in the extruder is thermally degraded. When this filter cartridge is used for filtration of ultra-pure water or for high purity drugs, elution often occurs from the thermally degraded portion. Thus, this cannot be used as a micro filtration membrane type filter cartridge.

In the latter method, the resin becomes molten by heat, and thermal degradation of resin occurs although partially. If the filter cartridge is used for the filtration of a highly corrosive fluid, harmful eluate may flow out. Also, because the melting temperature is high, the strength of the micro filtration membrane to be embedded is decreased, and heat distortion also occurs in the plate itself.

SUMMARY OF THE INVENTION

It is an object of the present invention to provide a method for manufacturing a filter cartridge of micro membrane pleats type, by which it is possible to stably manufacture products of high quality as a filter cartridge of micro membrane pleats and to reduce the cost of the production accordingly.

It is another object of the present invention to provide a method for manufacturing a filter cartridge of micro membrane pleats type, which can effectively eliminate heat degradation of the resin or heat distortion of the end plates.

Further, it is still another object of the present invention to provide a method for manufacturing a filter cartridge of micro membrane pleats type, which can remarkably increase bonding strength.

To attain the above objects, in the method for manufacturing a filter cartridge of micro membrane pleats according to the present invention, an initial portion and a last portion with pleats of a micro filtration membrane are welded together to prepare an endless micro membrane, and a filter element provided with said micro filtration membrane is welded on two end plates, characterized in that a bonding auxiliary plate made of a thin plate of the same material as said end plates is molten at relatively low temperature, said endless micro filtration membrane is welded on said molten bonding auxiliary plate, and said micro filtration membrane is welded on the end plates heated in advance.

Further, the method for manufacturing a filter cartridge according to the present invention is characterized in that a bonding auxiliary plate designed thinly to increase heat absorption is molten at relatively low temperature, and a filter element is quickly welded on the molten plate, and by bonding it on end plates heated in advance immediately after the above welding, heat degradation of resin and heat distortion of the end plates are prevented, and a filter cartridge of micro membrane pleats is welded and assembled perfectly without trapping air bubbles.

In the present invention, it is necessary to bond the filter element at first on the molten bonding auxiliary plate, and the end plates are then bonded. If this procedure is followed reversely, satisfactory results are not obtained. The reason for this is not yet elucidated.

In the case of welding and assembling of high micro filtration membrane with accuracy of 0.1 micron or more, rupture strength of the bonded plane is decreased, and the bonded surface between the plate and the membrane is likely to undergo heat degradation, thereby resulting in the increase of rejected items.

The above problems can be solved as follows: On said bonding auxiliary plate, a thin and high-flow (with low melt viscosity) bonding auxiliary ring of the same material as the end plates is heated together on said bonding auxiliary plate. On the bonding auxiliary ring with low melt viscosity, said filter element is welded, and the end plates heated in advance are pressed and bonded immediately after the welding.

By using a high-flow bonding auxiliary ring, a portion of the high-flow bonded auxiliary ring is molten and is sucked into the porous region of the high micro membrane by a capillary phenomenon. Accordingly, the integrity with the filter element is enhanced, and leaking is prevented and rupture strength of the membrane of the bonded portion is extensively increased by an anchoring effect.

The above and other objects and advantages of the invention will become more apparent from the following description.

DETAILED DESCRIPTION OF THE PREFERRED EMBODIMENT

In the following, an embodiment of the present invention is described in connection with the drawings.

Description is now given on a method for manufacturing by welding and assembling a filter cartridge of micro membrane pleats type, i.e., a so-called membrane filter cartridge, having absolute filtration accuracy of 0.1 micron and made of PTFE (fluororesin). The material of each component member in the embodiment, i.e., the material of end plates 10, bonding auxiliary plate 5, bonding auxiliary ring 6 and porous core 12 are all polypropylene except micro filtration membrane which is made of PTFE.

Figure 1:
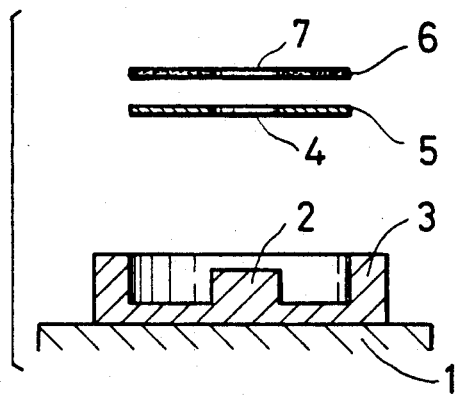
FIG. 1 is a cross-sectional view showing a welding jig, in which a bonding auxiliary plate and a bonding auxiliary ring are placed.
Figure 2:
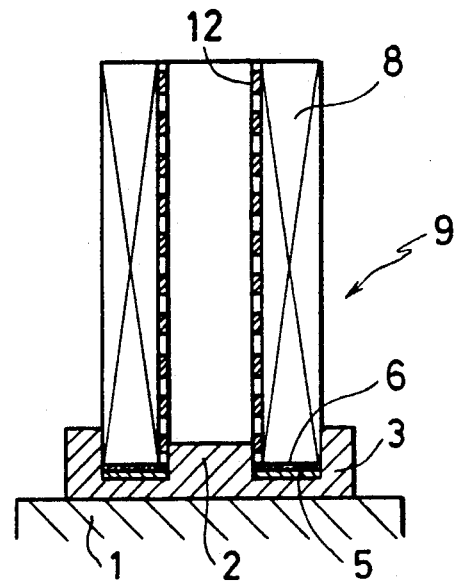
FIG. 2 is a cross-sectional view showing a welding jig, in which a filter element is placed after the bonding auxiliary plate and the bonding auxiliary ring are molten together.
Figure 3A:
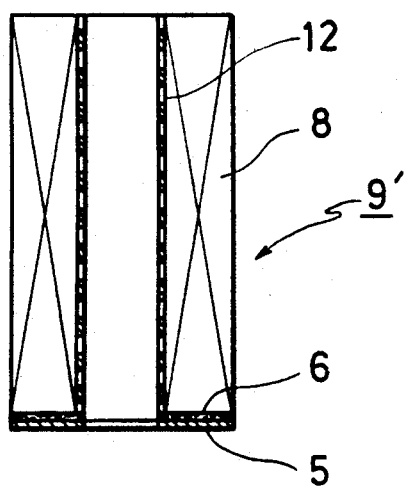
FIG. 3a is a cross-sectional view of the filter element, on which the bonding auxiliary plate and the bonding auxiliary ring are bonded.
Figure 3B:
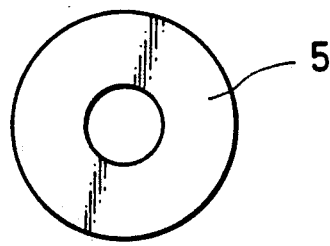
FIG. 3b is a bottom view of the same.
Figure 4:
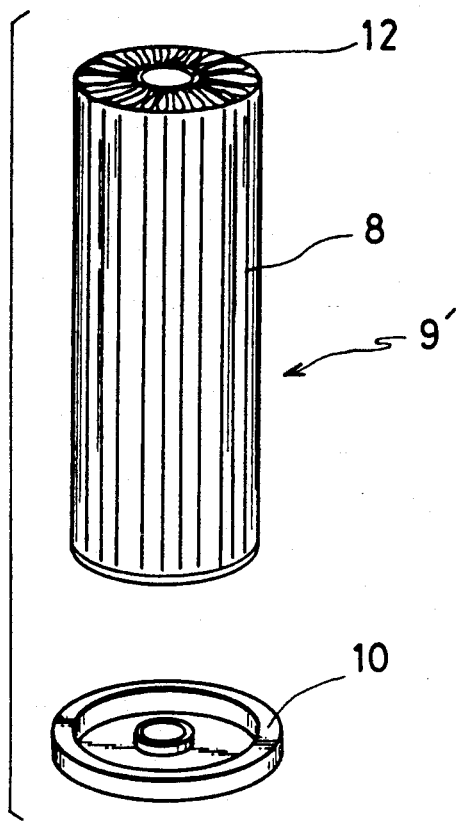
FIG. 4 is a perspective view of the filter element, on which the bonding auxiliary plate and the bonding auxiliary ring are bonded and which is bonded on end plates.
Figure 5:
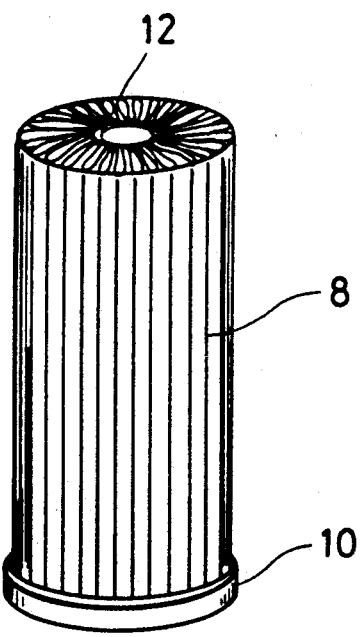
FIG. 5 is a side view of the filter element, on which end plates are bonded.
Figure 6:
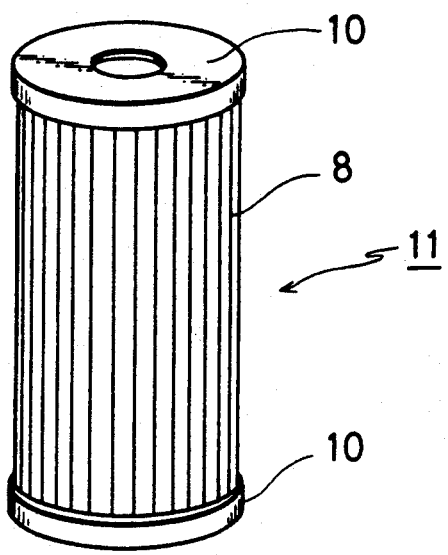
FIG. 6 is a side view of a filter cartridge of micro filtration membrane pleats type according to the method of the present invention.

As shown in FIG. 1, on a heater with temperature regulated to 220° C., a welding jig 3 having a projection 2 at its center is placed. A bonding auxiliary plate 5 having relatively high melt viscosity with melt flow rate of 40 g/10 min. (measured in accordance with the testing method of ASTM D 1238) and thickness of 0.6 mm is placed in said welding jig 3 by passing said projection 2 into a hole 4 at its center. At the same time, a bonding auxiliary ring 6 with thickness of 0.1 mm and having melt flow rate of 1000 g/10 min. and very low melt viscosity (i.e. high-flow) is placed in said welding jig 3, passing the projection through a hole 7 at its center. As shown in FIG. 2, an endless filter element 9 is prepared by winding micro filtration membrane with pleats on a cylindrical porous core 12, and this filter element 9 is placed on the molten bonding auxiliary ring 6 and pressed. As shown in FIG. 3, a high-flow portion of the bonding auxiliary ring 6 is sucked up to the filtration membrane 8, and an intermediate member 9' with blind ends is obtained. In this case, no stringing occurs due to the molten high-flow bonding auxiliary ring 6 because the bonding auxiliary plate 5 has high viscosity. Next, as shown in FIG. 4, the intermediate member 9' is pressed, before its heat is not subdued, on an end plate 10, which has been heated to about 80° C. in advance. Thus, the entire assembly is turned to the state shown in FIG. 5. Then, the same procedure is repeated for the other end surface, and a micro filtration membrane filter cartridge 11 as shown in FIG. 6 is obtained. The same filter cartridge can be produced using only the bonding auxiliary plate 5 and without using the bonding auxiliary ring 6.

There is no restriction on the bonding auxiliary plate 5 and the bonding auxiliary ring 6 except that the same thermoplastic resin as the end plates 10 is used. In addition to polypropylene as described in the above embodiment, nylon, polyester, etc. may be used according to the material of the end plates.

The thickness of the bonding auxiliary plate 5 used in this invention varies slightly according to the material, while it is preferable to use a plate with thickness of about 0.1 to 1 mm. If it is too thick, it is difficult to melt at low temperature. If it is too thin, stringing may occur.

The material of the bonding auxiliary ring 6 used in this invention is not limited to an object in plate shape as described in the above embodiment, and non-woven fabric may be used. The non-woven fabric becomes molten easier.

The bonding auxiliary ring 6 must be thinner than the bonding auxiliary plate 5 and must have higher melt flow rate. This is because the bonding auxiliary ring 6 must be changed to a more high-flow condition than the bonding auxiliary plate 5 when these two are heated at the same time.

The thickness of the bonding auxiliary ring 6 in the present invention varies depending upon whether it is in form of a plate or a non-woven fabric. It is preferable that the thickness is about 0.1 to 0.4 mm.

There is no restriction on the melt flow rate of the bonding auxiliary plate 5 and the bonding auxiliary ring 6, except that the bonding auxiliary ring 6 has a higher melt flow rate. Preferably, the melt flow rate of the bonding auxiliary plate is 1 to 50 g/10 min., and the melt flow rate of the bonding auxiliary ring is 200 to 1000 g/10 min.

As described above, according to the present invention, the filter element and the end plates are bonded together using a thin bonding auxiliary plate to increase heat absorption, and the bonding auxiliary plate is molten at a low temperature within a short time. Accordingly, it is possible to effectively prevent heat degradation of the resin and heat distortion on both end plates. It is also possible to extensively reduce the manufacturing cost of the micro filtration membrane type filter cartridge because defective products can be reduced. If a high-flow bonding auxiliary ring is used together with the bonding auxiliary plate, bonding strength is extensively increased by the anchoring effect because the high-flow portion of the bonding auxiliary ring is molten and absorbed in the porous region of the micro filtration membrane. Thus, even when this is applied for welding and assembling of a high micro filtration membrane, which is very likely to undergo heat degradation on its bonded surface, stable products with no quality defects can be produced.

What is claimed is:

1. A method of manufacturing a filter cartridge of a micro filtration membrane pleated type, comprising providing a filter element including an endless pleated micro filtration membrane welded at an initial portion and a last portion thereof to form the endless micro filtration membrane, and (b) a cylindrical porous core within said endless micro filtration membrane, heating a thin bonding auxiliary plate made of a thermomplastic resin material, having an opening at its center, and becoming molten at a relatively low temperature along with a bonding auxiliary ring which is made of a material having a lower melt viscosity material than the material of the bonding auxiliary plate and which is thinner than the bonding auxiliary plate, such that the bonding auxiliary ring becomes molten, welding said filter element on said molten bonding auxiliary ring, and welding a heated end plate of a material the same as the thermoplastic resin material of said bonding auxiliary plate to said bonding auxiliary plate.

2. A method for manufacturing a filter cartridge according to claim 1, wherein thickness of said bonding auxiliary plate is 0.1 to 1 mm.

3. A method for manufacturing a filter cartridge according to claim 1, wherein said bonding auxiliary ring is made of the same material as said thermoplastic resin material.

4. A method for manufacturing a filter cartridge according to claim 3, wherein said bonding auxiliary ring is in form of a plate or non-woven fabric.

5. A method for manufacturing a filter cartridge according to claim 3, wherein said bonding auxiliary plate is 0.1 to 1 mm in thickness and said bonding auxiliary ring is 0.1 to 0.4 mm in thickness.

6. A method for manufacturing a filter cartridge according to claim 3, wherein the melt flow rate of the bonding auxiliary plate is 1 to 50 g/10 min., and the melt flow rate of the bonding auxiliary ring is 200 to 1000 g/10 min.

* * * * *